United States Patent
Chen (10) Patent No.: US 9,195,274 B2
(45) Date of Patent: Nov. 24, 2015

(54) LOCK DEVICE WITH LEVER RELEASED IN CYCLE AND INSERTION DEVICE HAVING THE LOCK DEVICE

(75) Inventor: Hsiao-Ting Chen, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 814 days.

(21) Appl. No.: 13/471,074

(22) Filed: May 14, 2012

(65) Prior Publication Data

US 2013/0022393 A1  Jan. 24, 2013

(30) Foreign Application Priority Data

Jul. 20, 2011  (TW) .............................. 100125732 A (51) Int. Cl.
*E05C 19/10* (2006.01)
*G06F 1/16* (2006.01)

(52) U.S. Cl.
CPC ........... *G06F 1/1681* (2013.01); *Y10T 403/595* (2015.01)

(58) Field of Classification Search
CPC ..... G06F 1/181; G06F 1/1616; G06F 1/1662; E05D 11/00
USPC ............. 361/679.58, 679.17, 679.02; 292/95, 292/96, 116, 117, 121, 122
See application file for complete search history.

(56) References Cited

U.S. PATENT DOCUMENTS

| | | | | |
|---|---|---|---|---|
| 6,510,051 B2* | 1/2003 | Kim | ......................... | 361/679.43 |
| 8,817,456 B2* | 8/2014 | Lin et al. | ................... | 361/679.29 |
| 8,848,376 B2* | 9/2014 | Lee | ................................ | 361/725 |
| 2002/0071254 A1* | 6/2002 | Tien | ................................ | 361/727 |
| 2007/0164645 A1* | 7/2007 | Chen et al. | ................ | 312/334.47 |

* cited by examiner

*Primary Examiner* — Victor Batson
*Assistant Examiner* — Matthew Sullivan
(74) *Attorney, Agent, or Firm* — Guice Patents PLLC (57) ABSTRACT

The present invention relates to a lock device, which comprises a first lever and a third lever pivoted on a frame, and the first lever is pivoted with a second lever. When a first machine body inserted in the insertion device is desired to be removed, the third lever can buckle an unlocked lock member thereby preventing returning and allowing the first machine body to be easily removed; when the first machine body is inserted, the second lever drives the third lever to release the lock member for buckling and fastening the first machine body, then the third lever can be released and recovered through the second lever thereby allowing another cycle of buckling the unlocked lock member to be processed; as such, through continuously releasing of the levers in cycle, operations of inserting and removing the first machine body are more smooth and simplified.

22 Claims, 8 Drawing Sheets

LOCK DEVICE WITH LEVER RELEASED IN CYCLE AND INSERTION DEVICE HAVING THE LOCK DEVICE

BACKGROUND OF THE INVENTION

1. Field of the Invention

The present invention relates to a hinge device or lock device with lever released in cycle, especially to a hinge device or a lock device installed in an insertion device and utilizing leverage for continuously generating releasing actions in cycles.

2. Description of Related Art

With the development of information technology, a tablet PC which is easy to carry around is getting a significant market share, and the inputting means has changed to input via a touch screen therefore a conventional keyboard is not provided. However, for a user who has already gotten used to a desktop or notebook computer, a keyboard is still the inputting method which is faster and more convenient for him/her. In addition, a tablet PC is light in weight and easy to be carried around, but when being used on a table, the machine body which only has a screen is still not convenient, and other auxiliary accessories are often used, e.g. a support for allowing the screen to be vertically disposed, or a keyboard for providing a better inputting means. As such, a connection device is adopted for connecting the tablet PC and auxiliary accessories for providing more convenient operation.

Take the Taiwan Pat. No. M397130, titled in "Connection device" and issued to the applicant of the present invention as an example, when a tablet PC is inserted in an insertion slot of a seat body, a second buckle part of the tablet PC is buckled with a first buckle part of the insertion slot for buckling and fastening; when the tablet PC is desired to be removed, the user has to use one hand to press a push button for unlocking and use the other hand to remove the tablet PC, and during the removing process of the tablet PC, the push button has to be constantly pressed or the push button may return and become an obstacle for removing the tablet PC. As a result, the removing operation for tablet PC is not smooth and convenient and the disadvantage shall be improved.

SUMMARY OF THE INVENTION

One primary objective is to provide a hinge device with lever released in cycle and an insertion device having the hinge device; wherein when a lock member thereof is unlocked, the lock member can be positioned through levers thereby preventing from returning and allowing a first machine body inserted in an insertion slot to be easily removed; when the first machine body is inserted in the insertion slot, with several levers mutually interacting, the lock member is enabled to automatically return to buckle the first machine body for locking and fastening; and the levers can be released and recovered to the initial position for being ready for another cycle of inserting and removing operations.

For achieving the above-mentioned objective, one technical solution provided by the present invention is to provide a hinge device with lever released in cycle, which comprises:

a frame;
a first lever, pivoted with the frame through a first shaft, and installed with a drive part and a first recovery member;
a second lever, pivoted on the first lever through a second shaft, and installed with a second recovery member; and
a third lever, pivoted with the frame through a third shaft, and installed with a third recovery member, wherein one end of the second lever interferes with the third lever;

when the first lever rotates, the second lever drives the third lever to rotate an angle then the third lever is released for being returned, and after the first lever is recovered, the second lever is able to pass the interfere point defined relative to the third lever thereby recovering to the initial position.

Moreover, the present invention provides an insertion device, which comprises:

a seat body having an insertion slot;
a hinge device with lever released in cycle, fastened in the seat body and comprising: a frame; a first lever, pivoted with the frame through a first shaft, and installed with a drive part and a first recovery member, wherein the drive part is disposed in the insertion slot; a second lever, pivoted on the first lever through a second shaft, and installed with a second recovery member; a third lever, pivoted with the frame through a third shaft, and installed with a third recovery member, wherein one end of the second lever interferes with the third lever; and
a lock member, elastically and slidably installed in the seat body through an elastic member, and moveably buckled with the third lever;

when the first lever rotates, the second lever drives the third lever to rotate an angle for releasing the lock member, then the third lever is released for being returned, and after the first lever is recovered, the second lever is able to pass the interfere point defined relative to the third lever thereby recovering to the initial position.

According to one embodiment of the present invention, the lock member is provided with a lock rod buckled at a buckle part of the third lever.

As such, when a first machine body is inserted in the insertion slot for pressing the drive part, the first lever rotates with the first shaft serving as the pivot and compresses the first recovery member, meanwhile drives the second lever to jointly rotate, because one end of the second lever interferes with the third lever, the second lever presses the third lever to reversely rotate with the third shaft serving as the pivot, so the buckle part of the third lever is rotated and released from the lock member, and the lock member is released and returned thereby locking the inserted first machine body.

When the first machine body is inserted and positioned, the first lever and the second lever continuously rotate till releasing the third lever which reversely rotates, so the third lever is returned and recovered to the initial position through the third recovery member.

When the first machine body is desired to be removed, the lock member is pushed to move for unlocking, because the third lever has returned to the initial position, the lock member is able to be buckled at the buckle part of the third lever and prevented from returning, thereby allowing the first machine body to be smoothly and easily removed. At this moment, the first lever is returned and recovered through the first recovery member, and the second lever is driven to return and contact the third lever for forming interfere, the first lever continues to return, and the second lever reversely rotate relative to the first lever till passing the interfere point defined relative to the third lever, thereby returning to the initial position through the second recovery member.

As such, all levers can be recovered to the initial positions, and another cycle of insertion operation can be processed.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
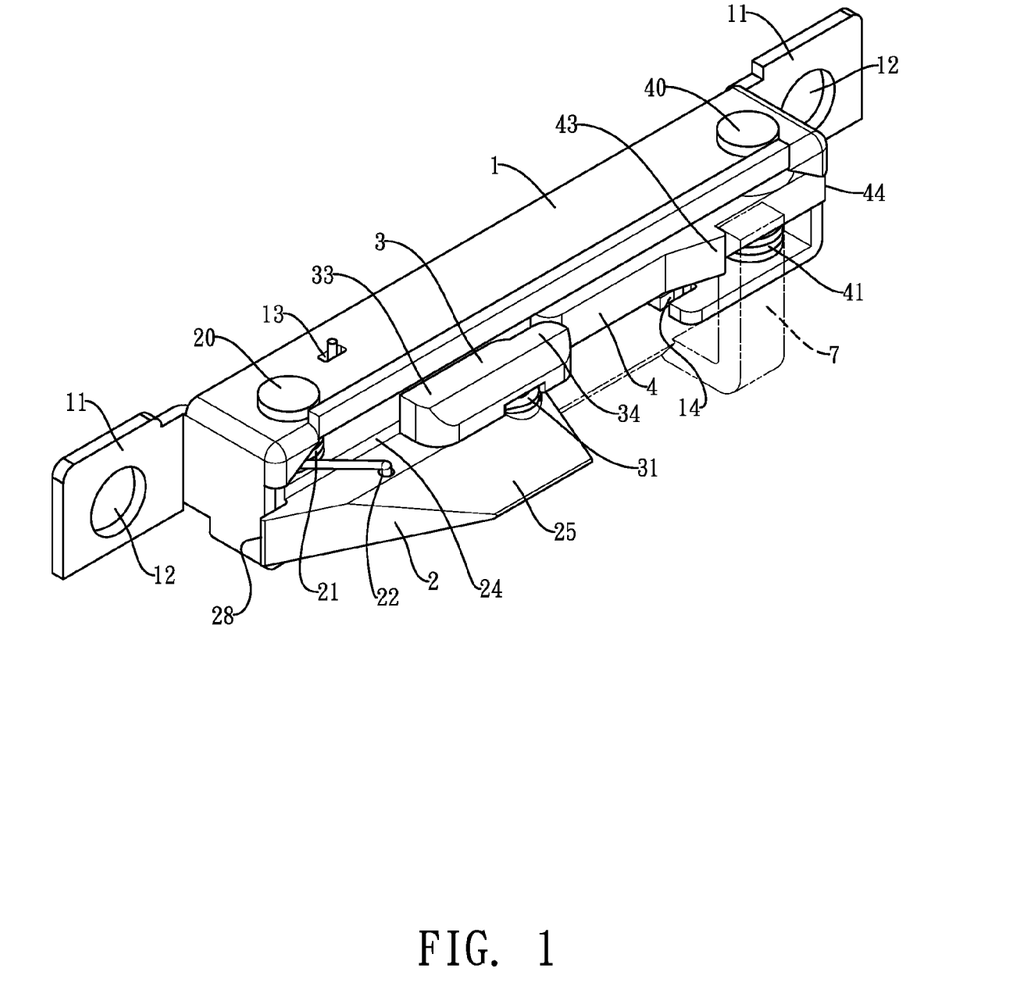
FIG. 1 is a schematic perspective view illustrating the assembly of the hinge device with lever released in cycle, according to the present invention.
Figure 2:
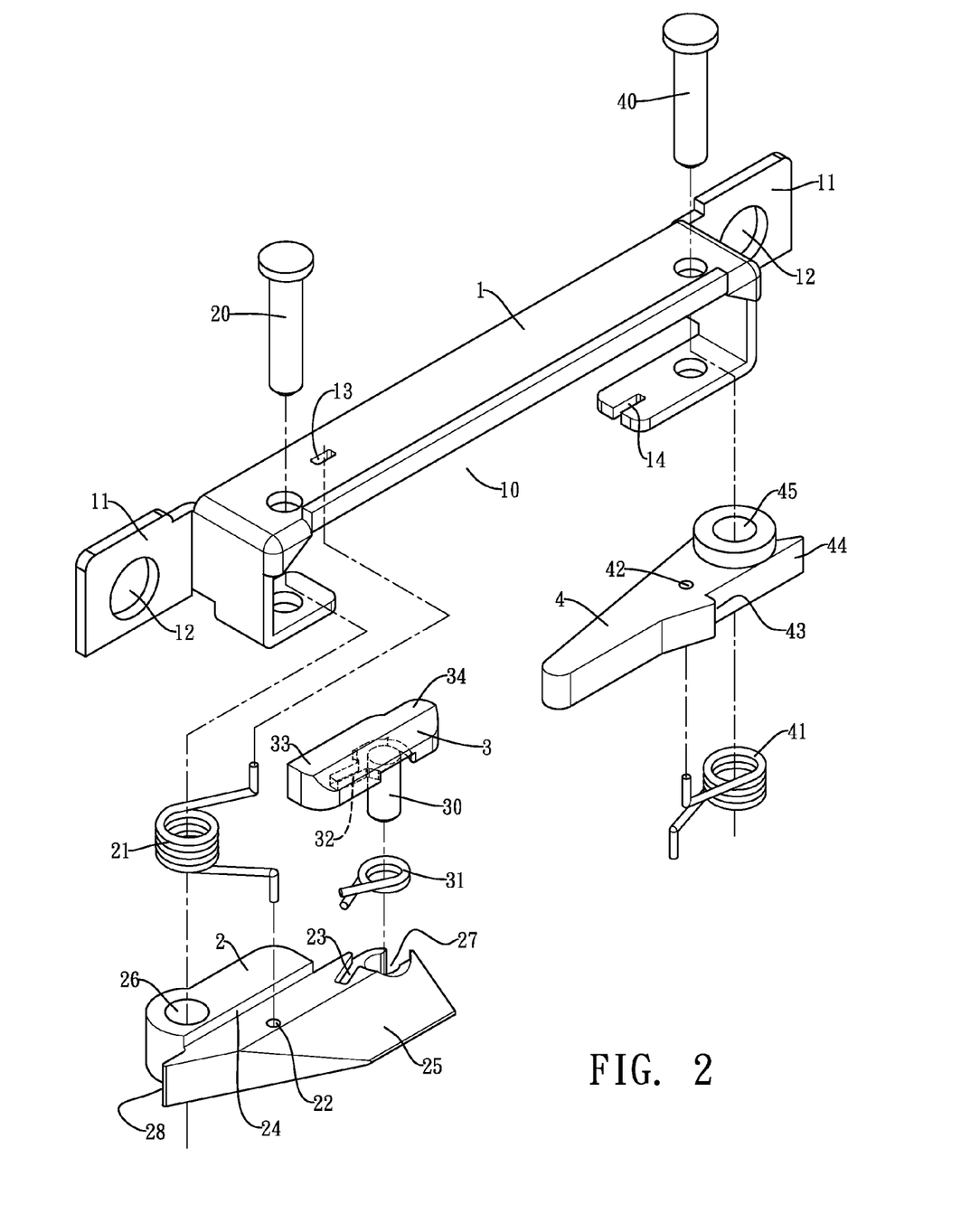
FIG. 2 is a schematic exploded view illustrating the components of the hinge device with lever released in cycle, according to the present invention.

Referring to FIG. 1 and FIG. 2, wherein FIG. 1 is a schematic perspective view showing the assembly of the hinge device or lock device with lever released in cycle and FIG. 2 is a schematic exploded view illustrating the components of the hinge device or lock device with lever released in cycle, according to the present invention. According to the present invention, the hinge device or lock device with lever released in cycle comprises a frame 1, three levers 2, 3, 4. The frame 1 is an elongated frame body and two ends thereof are respectively installed with a fasten sheet 11 having a fasten hole 12 for locking the frame 1 to a seat body. The central portion of the frame 1 is formed with an accommodation space 10 for accommodating a first lever 2, a second lever 3 and a third lever 4. Two ends of the frame 1 are respectively installed with a first shaft 20 and a third shaft 40. A first end of the first lever 2 is formed with a pivot hole 26 for being pivoted with the first shaft 20, and one end of the third lever 4 is also formed with a pivot hole 45 for being pivoted with the third shaft 40. The second lever 3 utilizes a second shaft 30 to be pivoted in a pivot hole 27 formed at a second end of the first lever 2. The top of the first lever 2 is installed with a first recovery member 21, the second lever 3 is installed with a second recovery member 31, and the bottom of the third lever 4 is installed with a third recovery member 41.

The first recovery member 21 is a torsion spring sleeved on the first shaft 20, two ends of the first recovery member 21 are respectively fastened in a fasten hole 13 formed on the frame 1 and a fasten hole 22 formed on the first lever 2. When the first lever 2 utilizes the first shaft 20 as a pivot to counter-clockwise rotate towards the accommodation space 10, the first recovery member 21 is compressed. The third recovery member 41 is a torsion spring sleeved on the third shaft 40, two ends of the third recovery member 41 are respectively fastened in a fasten hole 14 formed on the frame 1 and a fasten hole 42 formed on the third lever 4. When the third lever 4 is driven by the second lever 3 to rotate, the third recovery member 41 is in a compressed state.

The second recovery member 31 is a torsion spring sleeved on the second shaft 30, the second shaft 30 is integrally formed at the bottom of the second lever 3, the second lever 3 is disposed on the top surface of the first lever 2, and the bottom of the second lever 3 is formed with an accommodation slot 32, the top surface of the first lever 2 is also formed with an accommodation slot 23, and two ends of the second recovery member 31 are respectively fastened in the accommodation slots 32, 23.

The first lever 2 is protrudingly formed with a stop part 24 at a first end 33 of the second lever 3, so the rear surface of the first end 33 of the second lever 3 would be stopped by the stop part 24, thereby only allowing the second lever 3 to rotate in single direction. In addition, a second end 34 of the second lever 3 interferes with one end of the third lever 4, thereby driving the third lever 4 to rotate.

The second end of the first lever 2 is installed with a drive part 25 located outside the accommodation space 10 of the frame 1, when the drive part 25 is pressed and pushed, the first lever 2 is driven to rotate with the first shaft 20 serving as a pivot. The top surface of the drive part 25 is downwardly extended for forming an inclined surface, so when a first machine body 91 is inserted and downwardly pressed along the drive part 25 with the inclined surface, the first lever 2 can be more easily driven to rotate. The top surface of the drive part 25 is not limited to be designed as an inclined surface, the top surface can also be designed as an arc-shaped surface for facilitating the first machine body 91 to be inserted so as to drive the first lever 2 to rotate.

The first end of the first lever 2 is formed with a position limiting part 28 disposed at a lateral side of the frame 1 for limiting and positioning, thereby limiting the first lever 2 to rotate in another direction when the first machine body 91 is inserted. When the first lever 2 is returned through the elastic force provided by the first recovery member 21, a positioning state is formed.

The third lever 4 is installed with a buckle part 43, wherein a lock member 7 is elastically and moveably buckled with the buckle part 43 for being positioned, as shown in FIG. 1. One end of the third lever 4 is formed with a position limiting part 44 disposed at a lateral side of the frame 1 for limiting and positioning; when the third lever 4 is released and returned through the third recovery member 41, a positioning state is formed.

Figure 3:
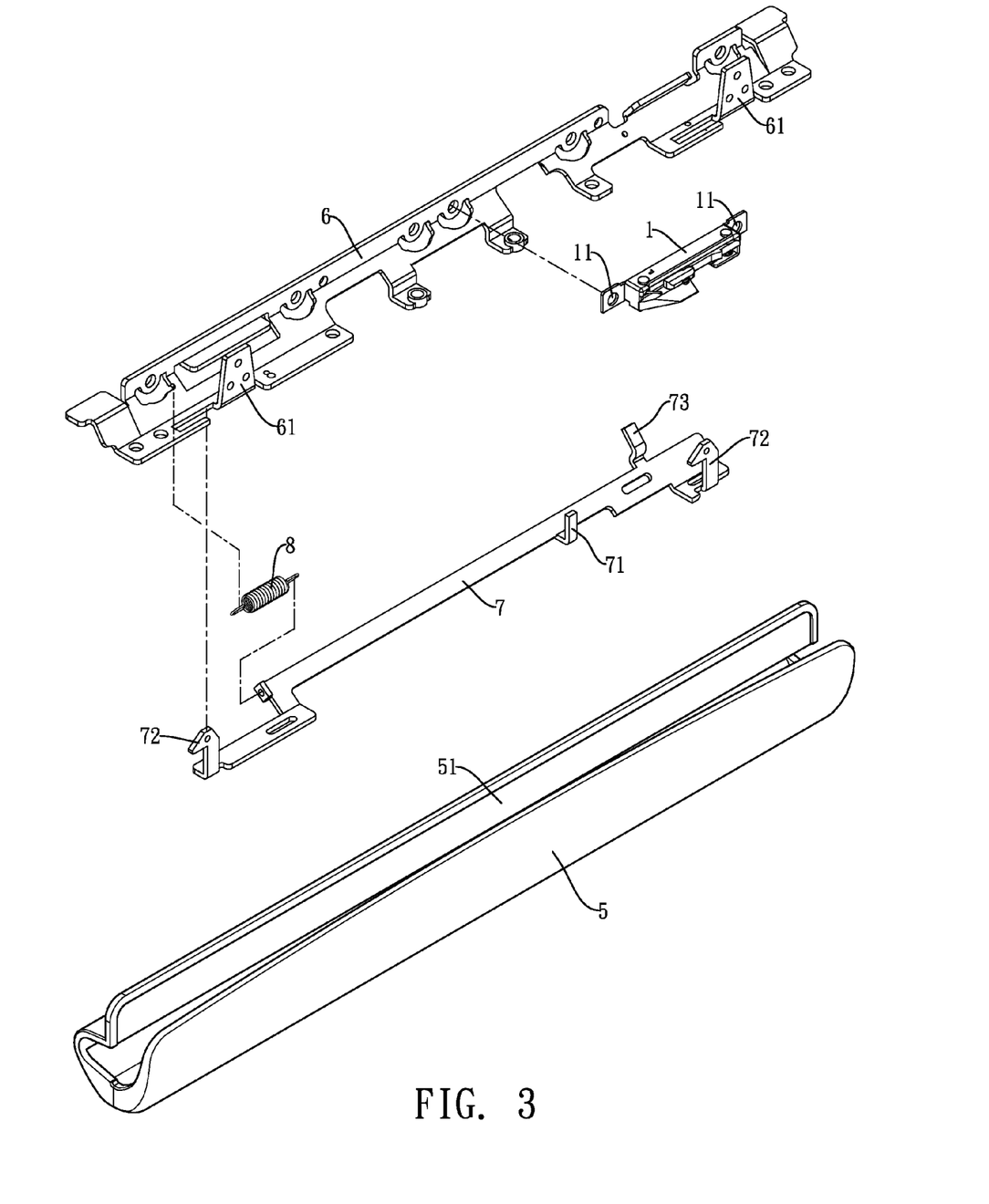
FIG. 3 is a schematic exploded view illustrating the components of the insertion device, according to the present invention.
Figure 4:
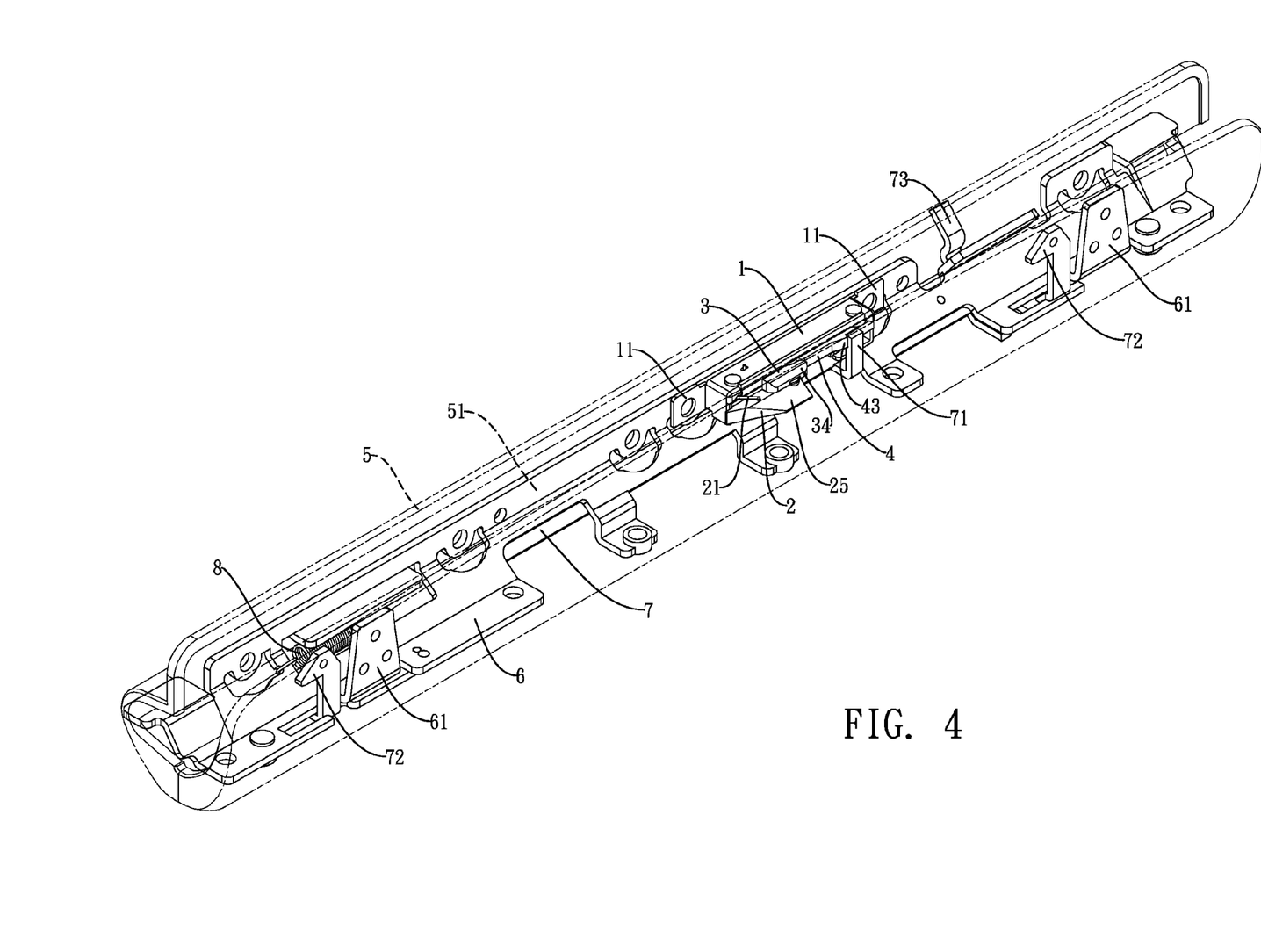
FIG. 4 is a schematic perspective view illustrating the assembly of the insertion device, according to the present invention.

Referring to FIG. 3 and FIG. 4, wherein FIG. 3 is a schematic exploded view illustrating the components of the insertion device and FIG. 4 is a schematic perspective view showing the assembly of the insertion device, according to the present invention. The insertion device provided by the present invention comprises a seat body 5 having an insertion slot 51, a fasten member 6 fastened in the seat body 5, a lock member 7 slidably installed in the seat body 5, and the hinge device or lock device with lever released in cycle is fastened through the fasten sheets 11 of the frame 1 being fastened with the fasten member 6 in the seat body 5.

The lock member 7 includes a lock rod 71 and two hooks 72 disposed at the right and left ends, an elastic member 8 is installed between the lock member 7 and the fasten member 6, wherein the elastic member 8 can be a spring, and the lock member 7 is protrudingly installed with a push rod 73 extended to the exterior of the seat body 5 for being sleeved with a push button, thereby allowing a user to unlock with his/her fingers. Said two hooks 72 can be buckled in a buckle hole formed at the bottom of the first machine body for fastening the first machine body, and the fasten member 6 is installed with a guide sheet 61 having narrower top and wider bottom so as to work with a guide hole formed at the bottom of the first machine body for guiding the first machine body to be inserted in the insertion slot 51.

The insertion device provided by the present invention is connected to a second machine body (not shown in figures), wherein the second machine body can be a keyboard, and the first machine body 91, e.g. a tablet PC, can be combined with second machine body through the insertion device. When being combined, the first machine body 91 is inserted in the insertion slot 51 of the seat body 5 for being fastened, as shown in FIG. 5.

Figure 5:
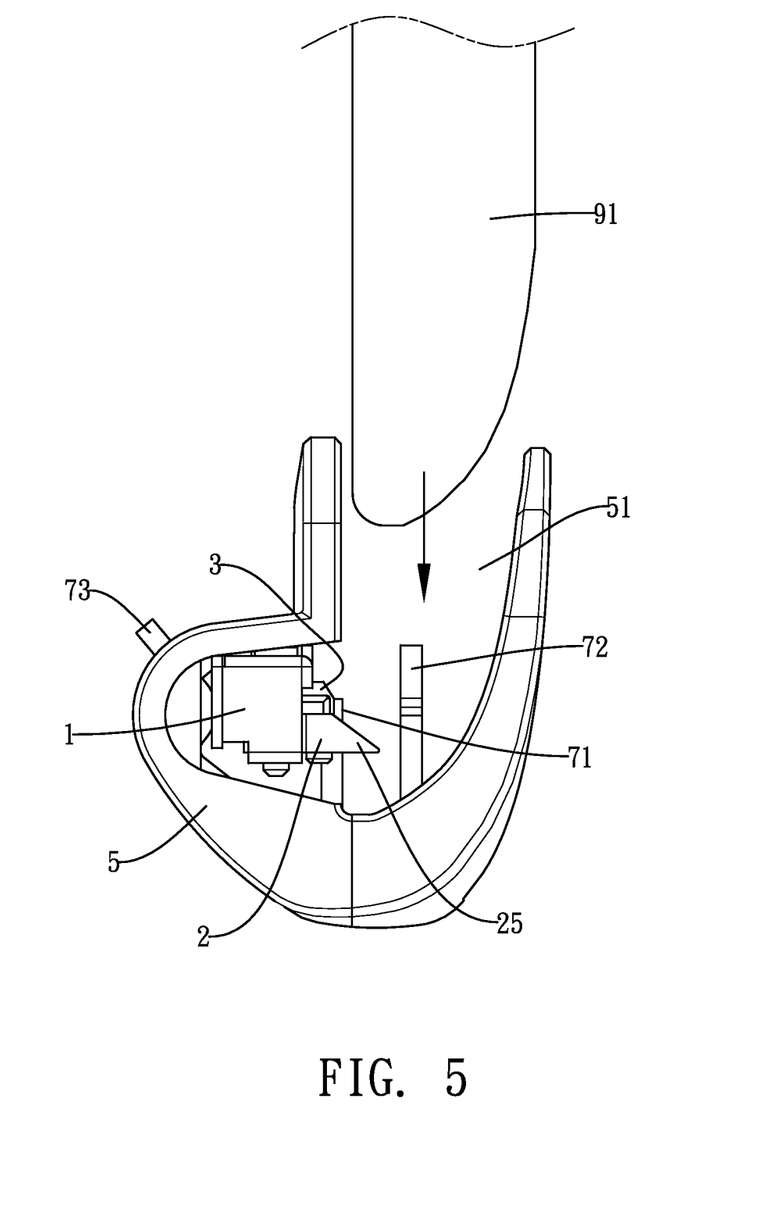
FIG. 5 is a schematic lateral view illustrating the operation of the first machine body being inserted in the insertion device, according to the present invention.
Figure 6:
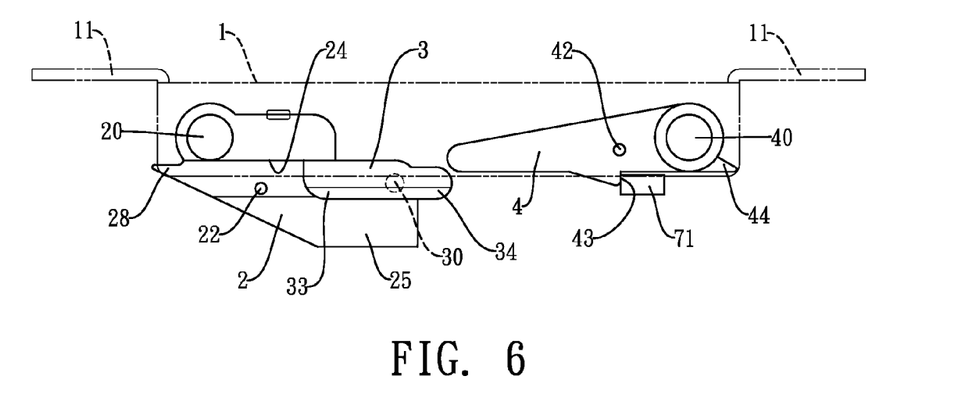
FIG. 6 is a schematic view illustrating the initial position of the first machine body not being inserted, according to the present invention.

Referring from FIG. 4 to FIG. 6, when the first machine body 91 is not inserted in the insertion device, the initial position of the lock member 7 is defined through the lock rod 71 being buckled at the buckled part 43 of the third lever 4, at this moment, the elastic member 8 is in a stretched state, and the drive part 25 of the first lever is located in the insertion slot 51, the second end 34 of the second lever 3 interferes with the third lever 4, the hooks 72 of the lock member 7 are also disposed in the insertion slot 51 and located at an unlocked position therefore not being buckled.

Figure 7:
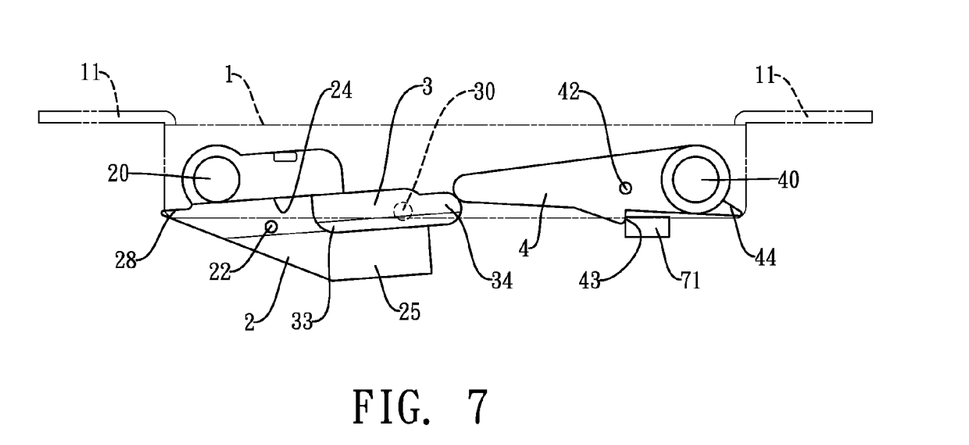
FIG. 7 is a schematic view illustrating the operation of inserting the first machine body in the insertion slot (I), according to the present invention.

When the first machine body 91 is inserted till being in contact with the drive part 25 of the first lever 2, the inclined surface enables an easy downward pressing thereby driving the first lever 2 to counterclockwise rotate with the first shaft 20 serving as the pivot, meanwhile compressing the first recovery member 21. The second lever 3 pivoted with the first lever 2 rotates with the first lever 2, then the second end 34 abuts the third lever 4 thereby driving the third lever 4 to clockwise rotate with the third shaft 40 serving as the pivot, meanwhile compressing the third recovery member 41, as shown in FIG. 7.

Figure 8:
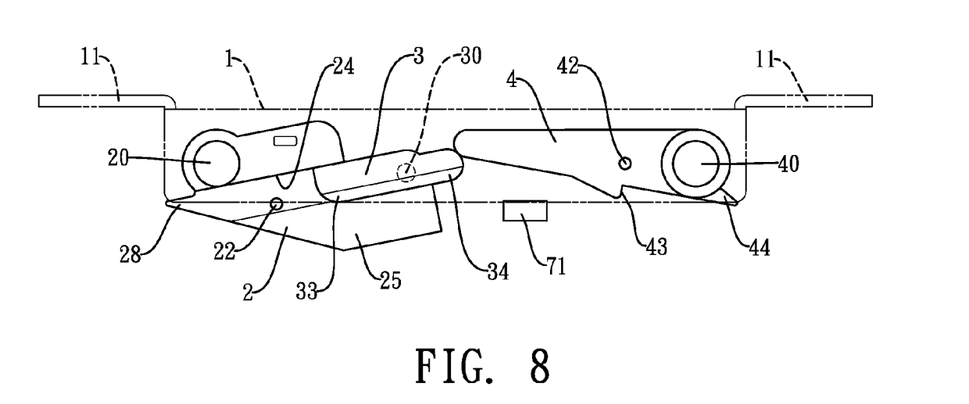
FIG. 8 is a schematic view illustrating the operation of inserting the first machine body in the insertion slot (II), according to the present invention.

Referring to FIG. 8, when the first machine body 91 is downwardly pressed about half way, the first lever 2 continues to drive the second lever 3 to press the third lever 4 to rotate, and the third lever 4 is released from the lock rod 71 of the lock member 7 after being rotated about half way, thus the lock member 7 is returned through the elastic member 8, the lock rod 71 is also returned, thereby moving the hooks 72 to a buckle position.

Figure 9:
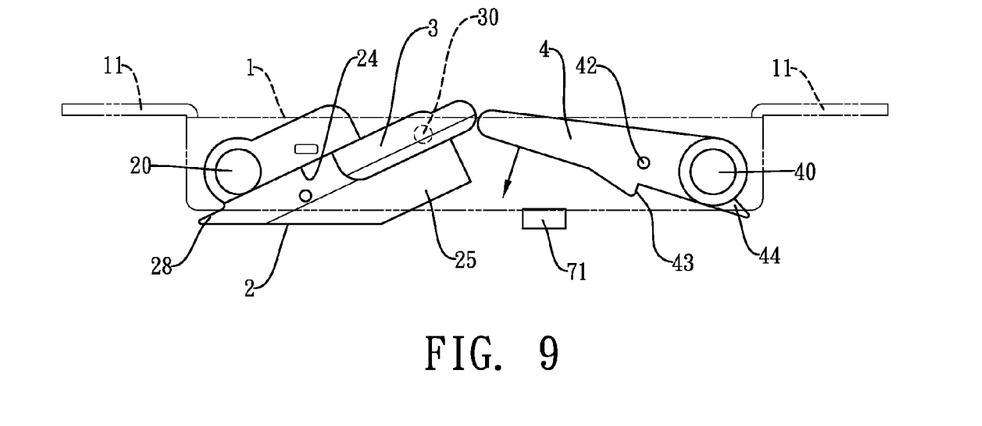
FIG. 9 is a schematic view illustrating the operation of inserting the first machine body in the insertion slot (III), according to the present invention.
Figure 10:
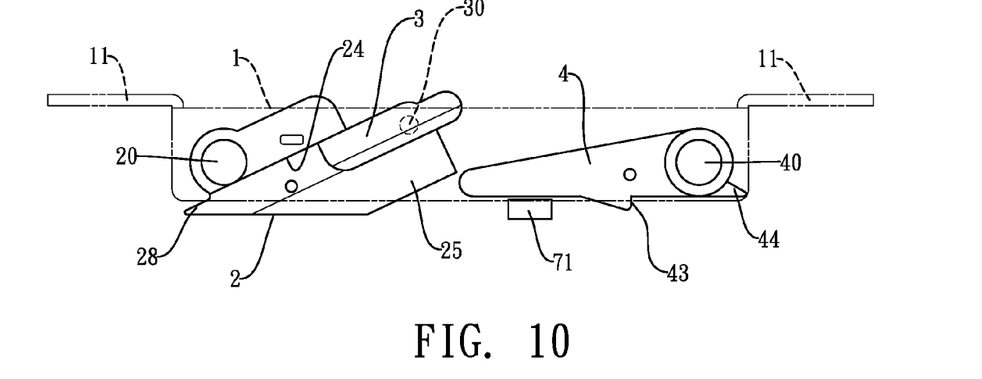
FIG. 10 is a schematic view illustrating the operation of inserting the first machine body in the insertion slot (IV), according to the present invention.

Referring to FIG. 9, when the first machine body 91 is completely pressed downward, the hooks 72 are buckled in buckle holes (not shown in figures) formed at the bottom of the first machine body 91, thereby fastening and locking the first machine body 91. At this moment, the second lever 3 rotates to a state of releasing the third lever 4. The third lever 4 is returned through the third recovery member 41 till the position limiting part 44 leaning against the frame 1 for being positioned, thereby recovering to the initial positioning, as shown in FIG. 10.

Figure 11:
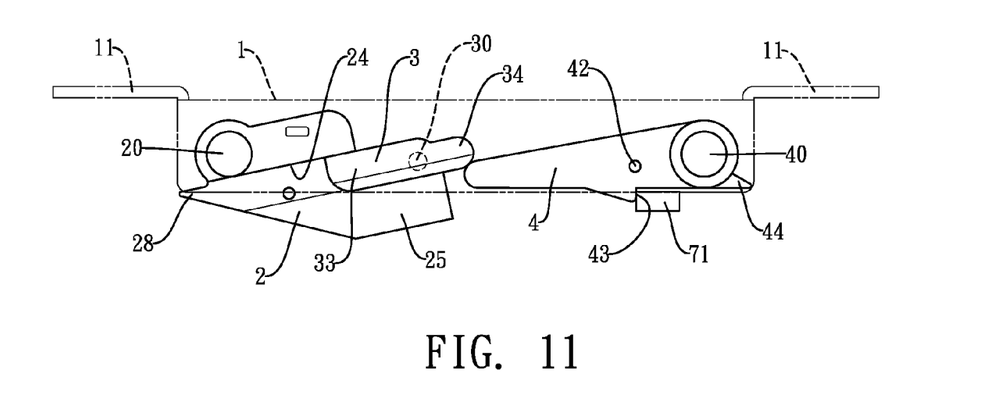
FIG. 11 is a schematic view illustrating the operation of inserting the first machine body in the insertion slot (V), according to the present invention.
Figure 12:
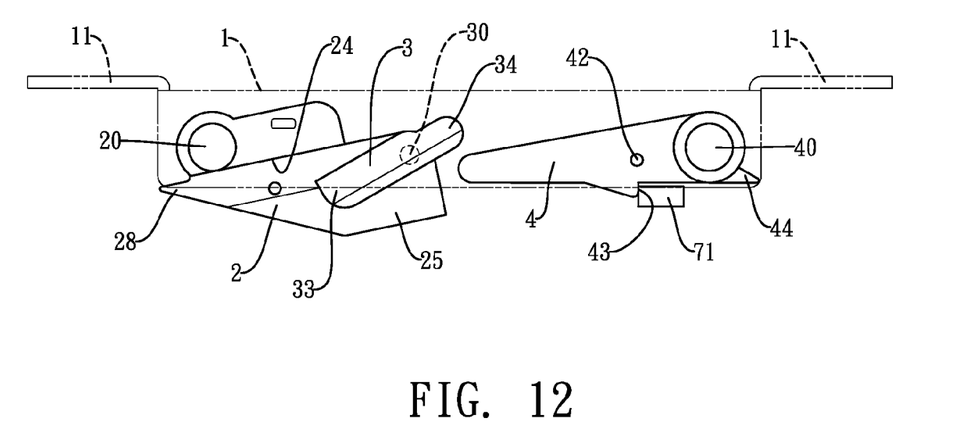
FIG. 12 is a schematic view illustrating the operation of inserting the first machine body in the insertion slot (VI), according to the present invention.

Referring to FIG. 11, when the first machine body 91 is desired to be removed, the push rod 73 is operated, so the lock member 7 is moved for releasing the hooks 72 from the buckle position, and the elastic member 8 is stretched, and the lock rod 71 is moved to the buckle part 43 of the third lever 4 for being buckled, so the lock member 7 is prevented from being returned through the elastic member 8, thereby allowing the first machine body 91 be easily removed. After the first machine body 91 is removed, the first lever 2 returns, and drives the second lever 3 to return together, when the second lever 3 is in contact with the third lever 4, the second end 34 of the second lever 3 interferes with the third lever 4, and the first lever 2 continues to return; as such, the second lever 3 counterclockwise rotates and compresses the second recovery member 31, as shown in FIG. 12.

Figure 13:
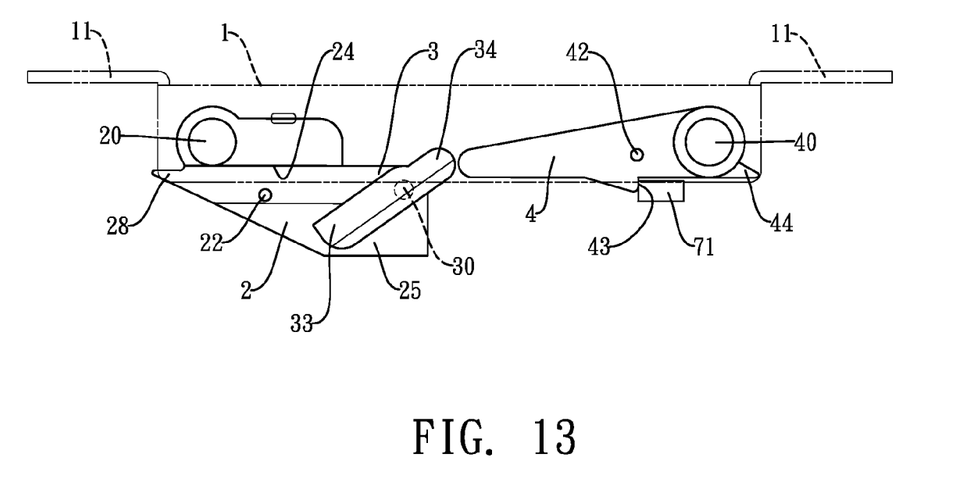
FIG. 13 is a schematic view illustrating the operation of inserting the first machine body in the insertion slot (VII), according to the present invention.

Referring to FIG. 13, the first lever 2 continues to return till the position limiting part 28 leaning against the frame 1 for being positioned thereby recovering to the initial position, the second lever 3 continues to counterclockwise rotate till the second end 34 thereof passes the interfere point defined relative to the third lever 4. The second lever 3 is then returned through the second recovery member 31 till the rear side being in contact with the stop part 24 of the first lever 2 for being positioned thereby recovering to the initial position, as shown in FIG. 6. As such, another cycle of inserting the first machine body can be processed.

According to the present invention, when the first machine body 91 is desired to be removed and the push rod 73 is pushed for unlocking, the buckle part 43 of the third lever 4 buckles the lock member 7 to prevent the lock member 7 from returning, thereby allowing the first machine body 91 to be easily removed.

After the first machine body 91 is removed, the first lever 2 and the second lever 3 can automatically recovery to the initial position, so when the first machine body 91 is inserted next time, the second lever 3 can drive the third lever 4 to release the lock member 7, thereby enabling the lock member 7 to lock the first machine body 91.

After the first machine body 91 is inserted and positioned, the third lever 4 can also automatically recover to the initial position thereby being enabled to buckle the lock member 7 while the first machine body 91 being removed.

Accordingly, through continuously releasing of the levers in cycle, operations of inserting and removing the first machine body is more smooth and simplified.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A lock device with lever released in cycle, comprising:
   a frame having an accommodation space;
   a first lever, located in the accommodation space and pivotally connected to the frame by a first shaft, and installed with a drive part and a first recovery member;
   a second lever, pivotally connected to the first lever by a second shaft, and installed with a second recovery member; and
   a third lever, pivotally connected to the frame by a third shaft, and installed with a third recovery member, wherein one end of the second lever interfering with the third lever;

wherein, the first lever, the second lever, and the third lever are movable between a first position, a second position, and a third position;

wherein, when the first lever, the second lever, and the third lever are located in the first position, a first end of the first lever engaging the frame, a first end of the third lever engaging the frame, the drive part of the first lever is located outside the accommodation space of the frame;

wherein, when the first lever, the second lever, and the third lever are located in the second position, the first end of the first lever is rotated away and spaced apart from the frame, the first end of the third lever is rotated away and spaced apart from the frame, the drive part of the first lever is located in the accommodation space of the frame;

wherein, when the first lever, the second lever, and the third lever are located in the third position, the first end of the first lever is rotated away and spaced apart from the frame, the first end of the third lever engaging the frame, the drive part of the first lever is located in the accommodation space of the frame.

2. The lock device with lever released in cycle as claimed in claim 1, wherein said first recovery member, said second recovery member and said third recovery member are torsion springs respectively sleeved on said first shaft, said second shaft and said third shaft; two ends of said first recovery member are respectively fastened on said frame and said first lever, two ends of said second recovery member are respectively fastened on said first lever and said second lever, two ends of said third recovery member are respectively fastened on said frame and said third lever.

3. The lock device with lever released in cycle as claimed in claim 1, wherein said third lever is installed with a buckle part, a lock member is selectively buckled to the buckle part.

4. The lock device with lever released in cycle as claimed in claim 1, wherein the top surface of said drive part is downwardly extended for forming an inclined surface or arc-shaped surface.

5. The lock device with lever released in cycle as claimed in claim 1, wherein said first shaft is inserted and fastened at one side of said frame, the first end of said first lever is formed with a pivot hole for being pivoted with said first shaft; said third shaft is inserted and fastened at another side of said frame, the first end of said third lever is formed with a pivot hole for being pivoted with said third shaft.

6. The lock device with lever released in cycle as claimed in claim 1, wherein said second shaft is integrally formed with said second lever, and said second lever utilizes said second shaft to be pivoted in a pivot hole formed at a second end of said first lever.

7. The lock device with lever released in cycle as claimed in claim 2, wherein said second lever is disposed on the top surface of said first lever, the bottom of said second lever is formed with an accommodation slot, the top surface of said first lever is also formed with an accommodation slot, two ends of said second recovery member are respectively installed in the accommodation slots.

8. The lock device with lever released in cycle as claimed in claim 1, wherein said first lever is protrudingly formed with a stop part at a first end of said second lever, the rear surface of the first end of said second lever is stopped by the stop part.

9. The lock device with lever released in cycle as claimed in claim 1, wherein the first end of said first lever is installed with a position limiting part, the position limiting part of the first lever limiting the rotation of the first lever when the position limiting part of the first lever engaging the frame.

10. The lock device with lever released in cycle as claimed in claim 1, wherein the first end of said third lever is installed with a position limiting part, the position limiting part of the third lever limiting the rotation of the third lever when the position limiting part of the third lever engaging the frame.

11. An insertion device, comprising:
a seat body having an insertion slot;
a lock device with lever released in cycle, fastened in the seat body and comprising: a frame having an accommodation space; a first lever, pivoted with the frame through a first shaft, and installed with a drive part and a first recovery member, the drive part being disposed in the insertion slot; a second lever, pivoted on the first lever through a second shaft, and installed with a second recovery member; a third lever, pivoted with the frame through a third shaft, and installed with a third recovery member, wherein one end of the second lever interfering with the third lever; and
a lock member, located in the seat body and connected to the seat body by an elastic member, and selectively buckled with the third lever;

wherein, the first lever, the second lever, and the third lever are movable between a first position, a second position, and a third position;

wherein, when the first lever, the second lever, and the third lever are located in the first position, a first end of the first lever engaging the frame, a first end of the third lever engaging the frame, the drive part of the first lever is located outside the accommodation space of the frame, the lock member engaging and buckled with the third lever;

wherein, when the first lever, the second lever, and the third lever are located in the second position, the first end of the first lever is rotated away and spaced apart from the frame, the first end of the third lever is rotated away and spaced apart from the frame, the drive part of the first lever is located in the accommodation space of the frame, the lock member is spaced apart from the third lever;

wherein, when the first lever, the second lever, and the third lever are located in the third position, the first end of the first lever is rotated away and spaced apart from the frame, the first end of the third lever engaging the frame, the drive part of the first lever is located in the accommodation space of the frame, the lock member is located adjacent to the third lever.

12. The insertion device as claimed in claim 11, wherein said lock member utilizes a lock rod to be buckled at a buckle part of said third lever.

13. The insertion device as claimed in claim 11, wherein said lock member is installed with hooks and protrudingly installed with a push rod.

14. The insertion device as claimed in claim 11, wherein said elastic member is a spring with one end fastened on said seat body and the other end fastened on said lock member.

15. The insertion device as claimed in claim 11, wherein a fasten member is installed in said seat body, and said lock device with lever released in cycle is fastened with the fasten member through said frame.

16. The insertion device as claimed in claim 11, wherein the top surface of said drive part is downwardly extended for forming an inclined surface or arc-shaped surface.

17. The insertion device as claimed in claim 11, wherein said first recovery member, said second recovery member and said third recovery member are torsion springs respectively sleeved on said first shaft, said second shaft and said third shaft; two ends of said first recovery member are respectively fastened on said frame and said first lever, two ends of said second recovery member are respectively fastened on said first lever and said second lever, two ends of said third recovery member are respectively fastened on said frame and said third lever.

18. The insertion device as claimed in claim 11, wherein said first shaft is inserted and fastened at one side of said frame, a first end of said first lever is formed with a pivot hole for being pivoted with said first shaft; said third shaft is inserted and fastened at another side of said frame, the first end of said third lever is formed with a pivot hole for being pivoted with said third shaft.

19. The insertion device as claimed in claim 11, wherein said second shaft is integrally formed with said second lever, and said second lever utilizes said second shaft to be pivoted in a pivot hole formed at a second end of said first lever.

20. The insertion device as claimed in claim 17, wherein said second lever is disposed on the top surface of said first lever, the bottom of said second lever is formed with an accommodation slot, the top surface of said first lever is also formed with an accommodation slot, two ends of said second recovery member are respectively installed in the accommodation slots.

21. The insertion device as claimed in claim 11, wherein said first lever is protrudingly formed with a stop part at a first end of said second lever, the rear surface of the first end of said second lever is stopped by the stop part.

22. The insertion device as claimed in claim 11, wherein the first end of said first lever is installed with a position limiting part, the position limiting part of the first lever limiting the rotation of the first lever when the position limiting part of the first lever engaging the frame, the first end of said third lever is installed with a position limiting part, the position limiting part of the third lever limiting the rotation of the third lever when the position limiting part of the third lever engaging the frame.

\* \* \* \* \*